United States Patent

[11] 3,593,522

[72] Inventors Hans Angert
Mannheim-Feudenheim;
Oskar Imb, Mannheim, both of, Germany
[21] Appl. No. 824,494
[22] Filed May 14, 1969
[45] Patented July 20, 1971
[73] Assignee Brown, Doveri & Cie A. G.
Mannheim, Germany
[32] Priority May 21, 1968, Mar. 29, 1969
[33] Germany
[31] P 17 50 645.5 and P 19 16 266.4

[54] ELECTROHYDRAULIC SERVO DEVICE
17 Claims, 9 Drawing Figs.

[52] U.S. Cl. ........................................... 60/53,
91/42, 92/98
[51] Int. Cl. ........................................... F16d 31/04,
F15b 15/26
[50] Field of Search.............................. 60/52 VM,
52, 53 WW, DIG. 7, 53; 92/89, 90, 91, 98 D;
91/42, 141, 142

[56] References Cited
UNITED STATES PATENTS

| | | | |
|---|---|---|---|
| 1,616,841 | 2/1927 | Beebe............................ | 60/52 X |
| 1,826,363 | 10/1931 | Miedbrodt..................... | 60/52 UX |
| 1,948,951 | 2/1934 | Walker........................... | 60/DIG. 7 |
| 2,196,522 | 4/1940 | Davis............................. | 60/52 |
| 2,280,291 | 4/1942 | Jaseph.......................... | 60/52 HD X |
| 2,330,739 | 9/1943 | Piron............................. | 60/52 B |
| 2,337,813 | 4/1945 | Darling......................... | 92/98 RD UX |
| 2,416,801 | 3/1947 | Robinson...................... | 60/53 WW |
| 2,467,509 | 4/1949 | Trautman...................... | 60/52 |
| 2,582,556 | 1/1952 | Morey........................... | 60/53 |
| 2,696,403 | 12/1954 | Baugh........................... | 60/52 HC X |
| 2,716,995 | 9/1955 | Baugh et al................... | 60/52 X |
| 2,916,879 | 12/1959 | Gondek........................ | 60/52 X |
| 2,927,429 | 3/1960 | Carlson........................ | 60/52 X |
| 2,984,985 | 5/1961 | MacMillin.................... | 60/97 P |
| 3,051,143 | 8/1962 | Nee................................ | 92/98 RD |
| 3,135,087 | 6/1964 | Ebert............................. | 60/53 X |

*Primary Examiner*—Edgar W. Geoghegan
*Attorney*—Jacobs & Jacobs

ABSTRACT: Electrohydraulic servo devices are described comprising an electric drive motor, a fluid medium pump connected to and driven by the drive motor, a tank containing hydraulic fluid as the pumping medium, a hydraulic servomotor communicating with and acted upon by the pump medium and means for reversing or operating in either of opposite directions of rotation the electric drive motor, the pump and the servomotor. Incoming and outgoing pressure medium lines are provided which are connected to the servomotor and form a closed circuit, each of the said pressure medium lines communicating with the tank containing the fluid medium and having a check valve therein to direct flow of medium from tank to pump.

ELECTROHYDRAULIC SERVO DEVICE

The present invention relates to an electrohydraulic servo device having an electric drive motor, a pump driven thereby, a fluid tank, and a hydraulic servomotor acted upon by the pressure medium of the pump.

Such servo devices may be used for many purposes in the arts, especially to actuate slides, ball cocks, valves, flaps, agitators and the like. A major object of the invention is to provide a device of the above-mentioned kind that is able to execute servo motions in two directions and also easily reversible, under hydraulic action. At the same time, the servo motions in both directions are readily controllable as to the desired force, stroke or angle, and time. Besides, the device is simple in construction and highly dependable.

For the solution of the above-stated problem, the electric drive motor, pump and servomotor according to the invention are reversible, viz. operable in both directions of rotation, and the pump is connected to the hydraulic servomotor by incoming and outgoing pressure medium lines forming a closed circuit, each of the said incoming and outgoing lines being in communication with the fluid tank by way of a check valve that opens for the direction of flow from tank to pump. The term "reversal" (Umsteuerung) as used herein is not to be construed narrowly in this context. It connotes not only changes in direction of rotation of the electric drive motor but also changes of its rotational speed, in particular including changes from zero to some finite quantity. In the servo device according to the invention, reversal as thus defined does not necessarily require any switching valves, slides or the like in the hydraulic system, that is, no mechanically actuated parts such as experience shows occasions leakage or is subject to trouble.

Reversal, or change of direction of rotation, of the hydraulic servomotor is accomplished in the servo device according to the invention simply by reversing, or changing the speed of rotation of the electric motor driving the fluid pump. Apart from the two check valves by means of which the incoming and outgoing lines connecting the pump and hydraulic motor communicate with the fluid tank, the reversal in the hydraulic system itself requires no further means or agencies.

In line with the high dependability to be obtained, another object of the invention is to take precautions whereby the electrohydraulic servo device is rendered self-arresting, i.e. wherein an inadvertent shifting of the setting member actuated by the hydraulic servomotor is prevented when the electric drive motor is stopped. For this purpose, in further development of the invention, in each of the lines ahead of and after the hydraulic servomotor a magnetic valve may be arranged, releasing the fluid circuit as long as the electric drive motor is switched on and closing the circuit when the drive motor is switched off.

In a preferred embodiment of the invention, a retaining means acting on the hydraulic servomotor when the drive motor is switched off may be provided.

The retaining means of the invention may be in the form of a brake, for example a multiple-disc brake. In a modified form of the invention, the retaining means may be in the form of locking means comprising two radially grooved flat discs, one mounted on the impeller of the hydraulic servomotor and the other in the motor housing, secured against rotation but axially displacable.

In the preferred embodiment of the invention, the brake or locking means is held in braking or locking position when the pump is stationary by a force acting upon it, for example spring action, and releasing means actuated when the pump is running by the fluid pressure generated by it is provided for the brake or locking means.

The brake or locking means constructed according to the invention ensures that the hydraulic servomotor, and member to be set by it (slide, valve, flap or the like), will dependably stop and remain precisely in the desired position when the electric drive motor of the fluid pump is stopped.

The present invention, which is intended to enhance the reliability and dependability of electrohydraulic servo devices, thus has the further object of overcoming difficulties and inadequacies that occur with regard to sealing, in particular of the hydraulic servomotor, in comparable known devices. For this purpose, the electrohydraulic servo device may further be constructed with a bladder of highly elastic material arranged one in front of and one behind the impeller in the pressure chambers of the hydraulic servomotor, each of the bladders having an aperture and being tightly connected by this aperture to the incoming or outgoing pressure medium line respectively in the motor housing, so that when acted upon by pressure medium it will contact with the impeller and transmit pressure to it. In this way there is a completely adequate seal of the electrohydraulic servo device, or its servomotor. Not only the seals provided on the rotary impeller or piston in conventional servomotors but also the seals for the hydraulic medium to the outside are eliminated. This has the further very important advantage that the correspondingly close finishing tolerances required in the conventional designs need not be observed.

There are also applications for the servo device according to the invention where flaps are to be actuated that must be closed if the electric drive fails; that is, provision must be made that such flaps will in that cast go into closed position either by their own weight or by the agency of the flowing medium. For this purpose, the invention provides means whereby the braking or locking means may be released even in case of power failure.

The invention is illustrated in the accompanying drawings by way of example.

Figure 1:
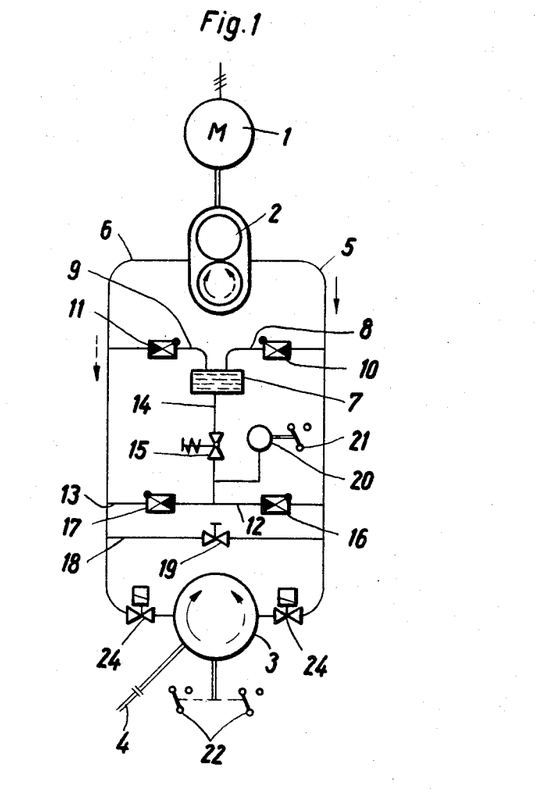
FIG. 1 schematically shows the circuit arrangement of a servo device according to the invention.

In FIG. 1, an electric drive motor 1 drives a gear pump 2 delivering the pressure medium and operable in either of two directions of rotation. The electric motor 1 may be set running by switching means known per se and not shown in detail. Motor 3 is a hydraulic servomotor with a setting shaft 4, connected to the element to be set, for example a slide, valve or the like. The motor 3 may be an impeller motor of a type known per se; alternatively, it may be a continuously running hydraulic motor if it is found expedient that the setting shaft execute several revolutions during the setting operation. The incoming and outgoing pressure medium (oil) lines connecting the pump to the servomotor 3 are designated at 5 and 6, respectively. According to the directions of rotation of the pump 2, the direction of circulation of the medium in lines 5, 6, and the direction of rotation of the hydraulic servomotor 3, will be in accordance with the solid or dotted arrows, respectively, in the drawing. Numeral 7 designates a tank for the hydraulic fluid. Lines 8, 9, each with a check valve 10, 11 opening in the direction of flow towards the pump, connect the tank 7 to lines 5, 6, respectively.

Further, each of the lines 5, 6 leading from pump 2 to servomotor 3 is connected by a branch 12, 13 to a line 14 leading to tank 7, in which line a check valve 15 responding to a definite adjustable pressure is disposed. In each of the branches 12, 13, a check valve 16, 17 is provided, opening for flow towards fluid tank 7. In addition, in each of lines 5 and 6, one magnetic valve 24 for each line is installed in front of and behind the hydraulic motor 3, releasing the fluid circuit as long as motor 1 is switched on. This renders the servo device self-arresting; that is, when the electric drive motor 1 is stopped, the setting shaft 4, or setting member coupled to it (brake lever or the like), will remain in the position assumed at that instant.

Finally, between the lines 5, 6 leading from pump 2 to hydraulic motor 3, another connecting line 18 is provided, with an adjustable bypass orifice 19 provided in said line. The bypass orifice 19 may be so adjustable that it will afford unlike port areas for one and the other direction of flow of the pressure medium. In this way, unlike speeds may be selected for the action and return motions of the servo device according to the invention, if, as may be expedient in many cases, the return is to be executed at higher speed and the action at lower speed or vice versa. The bypass orifice 19 might for example be in the form of a check valve acting in both directions of flow, not closing completely, and exposing an adjustable slit for each direction of flow when acted upon by the fluid pressure. Clearly also, the adjustable bypass orifice 19 might be so constructed that the port area, or the connecting line 18, would be completely obstructed by the orifice 19 in one or the other direction or in both directions.

A pressure-measuring means 20 is connected at a point ahead of the adjustable check valve 15 to the line 14 leading to the fluid tank 7. This pressure-measuring means may actuate an adjustable excess pressure contact 21 stopping the drive motor 1 of the fluid pump.

Numeral 22 refers to terminal contacts actuated by the hydraulic servomotor 3 when reaching extreme position, cutting off the supply of current to the drive motor 1 of the hydraulic pump. These contacts 22 may advantageously be adjustable so that they will be actuated by the servomotor after a selected stroke has been traversed.

The mode of operation of the electrohydraulic servo device according to the invention will be essentially understood from the foregoing. To execute a setting motion, it is requisite only to switch on the electric drive motor 1. This renders the two magnetic valves 24 operative as well, and they open the fluid circuit. When the extreme position of the hydraulic servomotor 3 is reached, the setting motion is terminated in the manner described by the adjustable terminal contacts 22. The return motion to initial position is accomplished by reversing the drive motor 1, and change of direction of the hydraulic servomotor 3, and likewise terminated by the contacts 22.

By means of the check valve 15, adjustable to a definite fluid pressure, the magnitude of the desired maximum torque of the servomotor 3 can be adjusted. Another safety feature is the adjustable excess pressure contact 21. By opening the adjustable bypass orifice 19, a definite selectable portion of the medium delivered by pump 2 can be bypassed by the hydraulic servomotor 3 through the bypass 18, thus changing the rotational speed of the hydraulic motor, and the setting time of the device. By virtue of the adjusting means mentioned, permitting easy yet precise control of torque, angle of rotation, and speed or setting time, the servo device of the invention is eminently suitable for actuation by remote control.

Figure 2:
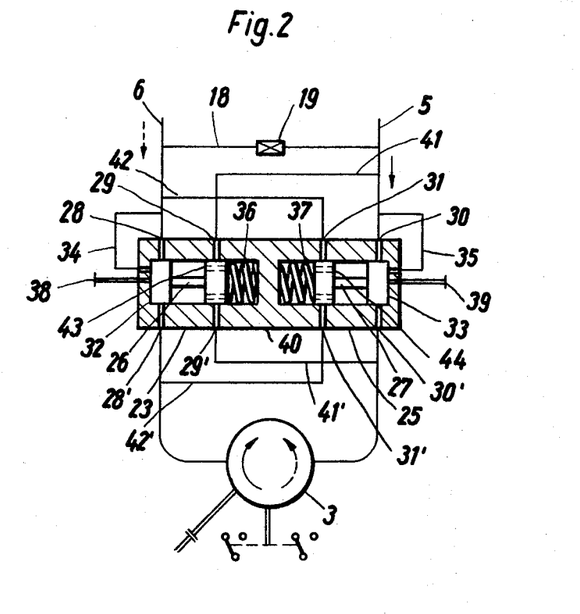
FIG. 2 shows one form of pressure-guided control valve for the servo device.

According to a modified form of the invention, illustrated in part in FIG. 2, in lines 5, 6 one pressure-guided control valve 23, 25 each may be provided in front of and behind the hydraulic servomotor 3, which valve, in the absence of pressure in lines 5, 6 will close the fluid circuit to and/or from the hydraulic servomotor 3, and in the presence of operating fluid pressure in the corresponding line 5 or 6, will open the circuit by way of the hydraulic servomotor.

In the embodiment of FIG. 2, the pressure-guided control valves 23, 25 are accommodated in a common housing 40. The relative arrangement of these valves may be varied as required; for example, the valves 23, 25 can be arranged with their axes parallel to each other.

Each of the two control valves 23, 25 has a double-acting piston 26, 27 displaceable in housing 40 against the force of a compressing spring 36, 37. Reference characters 28—31, 28'—31' designate control ports connected to lines 5, 6 in the manner shown for supply and return of hydraulic medium to and from the hydraulic servomotor. The ports 28, 28' and 30, 30' are connected to lines 6 and 5 respectively direct, while ports 29, 29' are in communication with the parts of line 5 respectively in front of and following the pressure-guided valve 25 and ports 31, 31' are connected to the parts of line 6 respectively in front of and following the pressure-guided valve 23 by way of branches 42, 42'.

The spaces in front of piston ends 32 and 33 respectively are in communication by way of further connecting lines 34, 35 with the parts of lines 6 and 5 leading to pump 2. The double-acting pistons 26, 27 have equalizing passages 43, 44 by means of which, when these pistons are displaced out of the position shown in the drawing, the pressure medium is able to drain out of the spaces containing the springs 36, 37 and equalize itself.

The mode of operation of the pressure-guided control valves described above is as follows. In rest position, i.e. when the electric drive motor, and pump 2, are stationary, the lines 5, 6 are practically free of pressure. The double-acting pistons 26, 27 are in the position shown in FIG. 2, with their valve edges covering the ports 28—31, 28'—31'. The fluid circulation from/to hydraulic servomotor 3 is thus closed and the desired self-arrest of the servo device is achieved. Then when, to execute a setting motion, the electric drive motor 1 is switched on, according to the selected direction of rotation, pump 2 will apply pressure to one of the lines 5, 6. Assuming the application of pressure to follow the direction of the arrow drawn dotted in line 6, the pressure will be propagated by way of the connecting line 34 into the chamber in front of piston end 32 of control valve 23, piston 26 will be displaced to the right against the force of spring 36, and ports 28, 29 and 28', 29' will be cleared. The hydraulic medium passes by way of line 6 and ports 28, 28' to the hydraulic servomotor 3, which is set in rotation in the direction of the dotted arrow. The medium leaving servomotor 3 finds its way through branch 41', ports 29', 29 and branch 41 into the part of line 5 leading to the suction side of pump 2. When the electric drive motor 1, and pump 2, are operated in reversed direction of rotation (fluid circulation following direction of solid arrows), the control valve 25 will act similarly.

It may become necessary in case of trouble, for example electric power failure, to set manually the setting member (not shown) actuated by the hydraulic servomotor 3, or rather by its shaft. In order to defeat the self-arrest of the electrohydraulic servo device in such an emergency, the pressure-guided control valves 23, 25 provided according to the invention may be furnished with manually operable setting means 38, 39 with which pistons 26, 27 are displaceable against the action of springs 36, 37 far enough to clear ports 28—31, 28'—31'. The manual emergency operation may advantageously be effected by way of the shaft of the electric drive motor 1, which may for this purpose be provided with polygonal stub means to receive and hold a handwheel or a special lever. A similar means may be provided if necessary on the setting shaft 4 of the hydraulic motor 3 as well.

The servo device according to the invention, including valves and auxiliary means, may be integrated without difficulty in a self-contained, compact structural unit. The several parts may thus be accommodated in a cylindrical housing, or they may be arranged in a plurality of housing parts joined in fluidtight manner to each other. The fluid tank 7 may be of comparatively small size, since it need hold only a relatively small quantity of fluid to replace incidental losses.

No special piping outside the housing accommodating the device is required, since passages provided in the housing or its parts can serve for the circulation of hydraulic medium. The result is a very compact, rugged and space-saving form of the device, which properties afford a wide sphere of application.

The invention is not limited to the embodiments illustrated and described. Various other modifications are conceivable. Thus, instead of a gear pump, any hydraulic pump known per se that operates in both directions of rotation may be used.

The electric drive motor need not be a three-phase motor; instead, for example, a reversible single-phase squirrel cage motor may be used, or a motor of readily variable speed (direct current motor, pole-reversible motor). The installed position of the device need not necessarily be perpendicular. The axis of the device may alternatively assume an inclined or a horizontal position in operation.

The servo device according to the invention is suitable for a wide variety of setting operations. Whenever required, by selecting an appropriate electric drive motor, it may be so constructed that the speed of the setting motion will vary along the travel. The possibility of traversing the travel in a plurality of steps, that is, of occupying intermediate positions, is immediately available. Thus the setting motion may be controlled automatically with the aid of end and/or intermediate contacts; alternatively again, it may be preformed manually, that is, operated visually.

Figure 3:
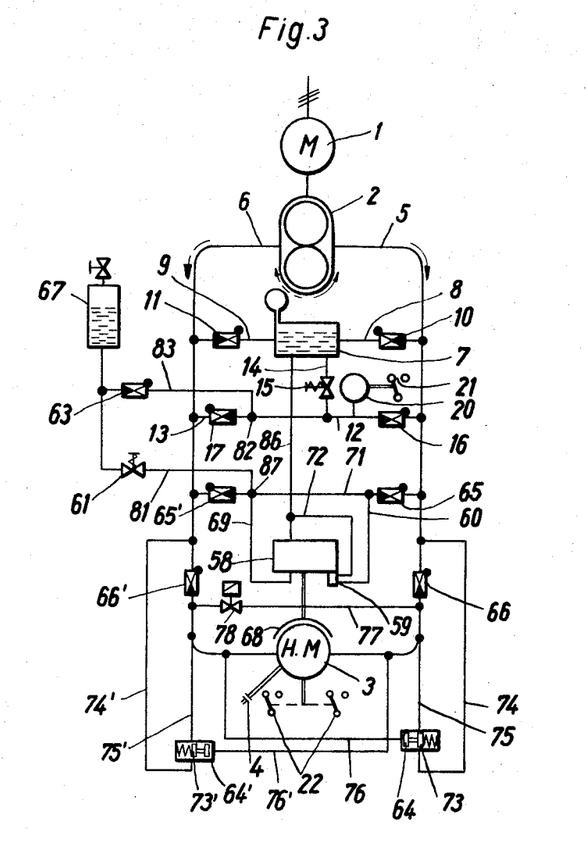
FIG. 3 schematically shows the servo device with braking and releasing means.

FIG. 3 schematically shows the servo device according to the invention with a retaining means acting on the hydraulic servomotor when the drive motor is switched off, which means may for example take the form of a multiple-disc brake. For parts corresponding to parts found in FIGS. 1 and 2, the same reference numerals have been adopted in FIGS. 3 and following.

The brake indicated at 68 is kept in braking position when the pump is inactive by a force, for example spring action, acting on the braking member, In addition, a hydraulic brake-releasing means 58 is provided, actuated when pump 2 is running by the fluid pressure generated by the latter.

Figure 4:
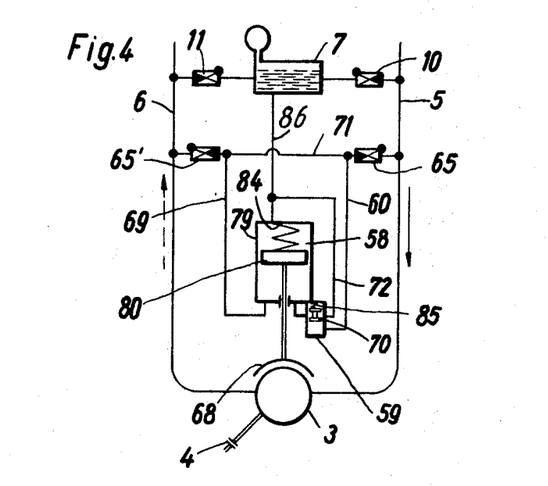
FIG. 4 shows details of the braking and releasing means.

The brake-releasing means 58 consists, in a preferred embodiment of the invention, of a piston 80 displaceable in a hydraulic cylinder 79 and connected mechanically with the brake 68 proper (compare FIG. 4). Each of the incoming and outgoing lines 5, 6 connecting pump 2 to servomotor 3 is in communication by way of a check valve 65, 65' with the brake release cylinder 79, namely by way of a line 69. The check valves 65, 65' are arranged to open for the direction of flow towards the brake release cylinder. As may be seen in FIG. 4, line 69 is so connected to the brake release cylinder 79 that fluid pressure arising in line 69 will tend to displace piston 80 of the brake-releasing device against the action of spring 84 in the direction of releasing the brake 68. The two check valves 65, 65' have a small orifice for pressure relief when pump 2 is inactive. Further, brake release cylinder 79 is provided with a pressure control valve 59 whose piston 70 may be acted upon by the fluid pressure in the incoming and outgoing lines 5 and 6 by way of a line 60 branching off from the connecting line 71 between the two check valves 65, 65'. Also, a line 72 or 86 connecting the brake release cylinder 79 to the fluid tank 7 is provided. The arrangement is such that when the fluid pressure is present in incoming and outgoing lines 5, 6, the control piston 70 will be displaced against the action of a spring 85 and move to close the line 72 connecting brake release cylinder 79 to fluid tank 7, whereas in the absence of fluid pressure in the incoming and outgoing lines 5 and 6, piston 70 will displace far enough to clear line 72.

The invention further makes provisions serving to relieve the brake. For this purpose, each of the incoming and outgoing lines 5, 6 as an additional check valve 66, 66' opening in the direction of flow towards servomotor 3. Besides, one control pressure valve 64, 64' each is provided, whose control piston 73, 73' according to its position, will open or close a detour line 74, 75—74', 75' connected to the incoming/outgoing line 5, 6 in front of and rearward of the further check valves 66, 66'. The control pistons 73, 73' of control pressure valves 64, 64' can be subjected to the fluid pressure prevailing in lines 5, 6, namely each by way of a control line 76, 76'. The control lines 76, 76' are respectively connected between servomotor 3 and the further check valves 66', 66 to one of the incoming and outgoing lines 6, 5 namely control line 76 to line 6 and control line 76' to line 5.

The mode of operation of the arrangement described above will essentially be understood from the foregoing, as follows:

In executing a setting motion, i.e. in switching on the electric drive motor 1, for example in a direction of rotation and of flow of the hydraulic medium corresponding to the solid arrows, the fluid pressure in line 5, by way of check valve 65, displaces control piston 70 of pressure control valve 59, into the position shown in FIG. 4, so that the return of fluid from underneath piston 80 of the brake-releasing means 58 into tank 7 is cut off. Thus the pressure medium supplied by way of lines 71, 69 to brake release cylinder 79 is able to displace piston 80 against the action of spring 84, releasing the brake. After traversal of the preestablished travel, or termination of the setting motion, for example by the adjustable end contacts 22, the electric motor 1 switches off. This eliminates fluid pressure in lines 5, 6, 60 so that the control piston 70 of pressure control valve 59 is displaced by spring 85 and the passage by way of line 72 is cleared. The fluid in brake release cylinder 79 under piston 80 can flow by way of lines 72 and 86 to tank 7, so that piston 80 will displace toward the rod end of cylinder 79 under the action of spring 84 and apply the brake 68. At the same time, owing to the arrangement of the two further check valves 66, 66', the brake is relieved, since the fluid circulation through these valves is shut off. With motor 1 switched on and pump 2 running, for example with direction of delivery corresponding to the solid arrows, check valve 66' must be detoured. This is accomplished in that the fluid pressure, by way of control line 76', displaces the control piston 73' of the control pressure valve 64' enough to clear the passage through the detour lines 75', 74'.

To enable the setting shaft 4 of the hydraulic motor 3 to be turned even in case of power failure, i.e. with pump 2 inactive, for example in order in such a case to permit the closing of a flap or the like actuated by the servo device, it is necessary first to make possible a circulation of fluid by way of servomotor 3 even with pump 2 inactive (in spite of the check valves 66, 66'), and second to release the brake 68. For this purpose, according to still another embodiment of the invention, a connecting line 77 short circuiting the hydraulic servomotor is provided between the incoming and outgoing lines 5, 6, in which a magnetic valve 78 is arranged to clear the connecting line 77 in case of electric power failure. Instead of the magnetic valve 78, a valve manually operable at will may be arranged in line 77. To enable the brake to be released in the case mentioned, an oil reservoir 67 having an air cushion is provided and connected by way of a line 81 having a shutoff valve 61 to the brake release cylinder 79 in such a way that fluid pressure occurring in line 81 will tend to displace the piston 80 of the brake-releasing means 58 in the direction of releasing the brake 68. The line 81 may be connected at a point 87 to the line 71 connecting the two check valves 65, 65', and to the line 69; also, an additional line 83 connecting the oil reservoir 67 to a point 82 of the oil system—a point under fluid pressure when pump 2 is operating—is provided, in which there is a check valve 63 opening in the direction of flow to the oil reservoir 67. The valve 61 arranged in line 81 may be a magnetic valve, opening in case of electric power failure; alternatively, it may be in the form of a valve that can be actuated manually at will.

If the electric power to drive the motor 1 fails, and if in such case a flap actuated by the servo device according to the invention—and happening to occupy an intermediate position at that instant—is supposed to close, for example by its own weight, this will be simply and dependably effected owing to the arrangement just described, in that the magnetic valve 78 opens the fluid circuit through line 77 to connect opposite sides of servomotor 3. Optionally, as aforesaid, a manually operated valve may serve this purpose. By way of the magnetic valve 61 rendered operative at the same time, pressure medium is passed from reservoir 67 by way of lines 81 and 69 under the piston 80 of the brake-releasing means, actuating it in the direction of releasing the brake. Since at the same time the pressure control valve 59 is acted upon by fluid pressure from point 87 by way of lines 71, 60, its control piston is displaced in such direction that the connecting line 72 from brake release cylinder 79 to tank 7 can be closed, i.e. pressure can build up under piston 80. During operation of the servo device according to the invention, the reservoir 67 is kept continuously under pressure. The medium is supplied to it by way of line 83. Relative to the preferred embodiment of the invention, the (reserve) oil tank 7 should in this case be of somewhat greater capacity, since in the case of the present invention it must also temporarily accommodate the oil exhausted from the head end of piston 80 when the brake is being released.

Figure 5:
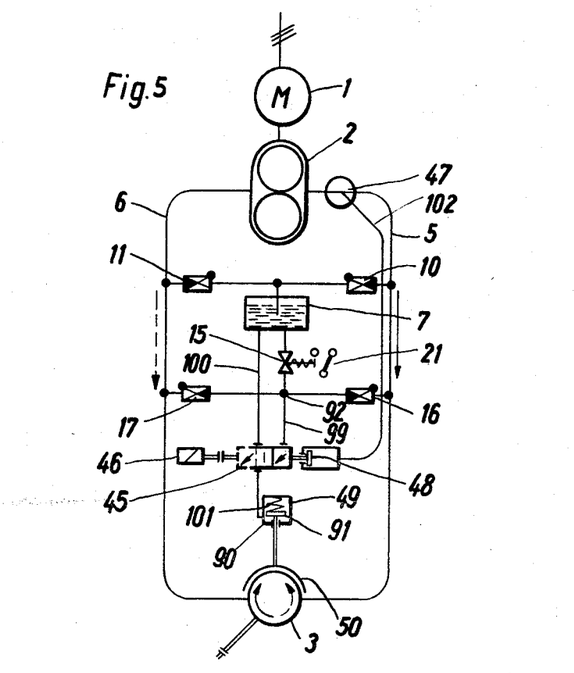
FIG. 5 shows a modified form of the servo device with retaining and releasing means.

According to a highly advantageous developed form of the present invention, the actuation of the retaining or locking means and of the corresponding releasing means may be effected as illustrated in FIG. 5. The locking means and its releasing means are schematically indicated at 50 and 49 respectively. The locking means may consist in detail, as earlier described, of two grooved flat discs, held together in the absence of pressure (pump 2 inactive) by a spring 101. One of the two discs is secured to the impeller of the hydraulic servomotor 3, the other against rotation in the motor housing; but the latter is axially displaceable, and in the form of a piston 91. It may be acted upon and released by fluid pressure.

According to this form of the invention, a control member 45 is provided, which in one position connects the cylinder space 90 at the rod end of the piston of the releasing means 49 by way of a line 99 to a point 92 of the fluid circuit that is under pressure when pump 2 is operating. In the other position of control member 45, cylinder space 90 is connected to tank 7 by way of a line 100.

An electromagnet 46 serves to actuate the control member 45 according to the switch condition of drive motor 1. The arrangement is such that when motor 1 is switched on, the electromagnet 46 actuates control member 45 so that the connection between cylinder space 90 and point 92 is made by way of line 99, causing piston 91 of releasing means 49 to be acted upon by fluid pressure and so releasing the locking means 50, enabling the intended setting motion to be executed. With motor 1 switched off, or at termination of the setting motion, electromagnet 46 is likewise shut off, thus bringing control member 45 into rest position, whereby cylinder space 90 is connected by way of line 100 to tank 7. This eliminates pressure from the space under piston 91, so that the locking means is moved into its engaged position by the action of spring 101.

Instead of an electromagnet 46, according to another embodiment of the invention, a flow-guided control may be provided to actuate control member 45 and releasing means 49. For this purpose, a static tube 47 may be installed in each incoming or outgoing line 5, 6 beyond pump 2. To actuate control member 45, a control piston 48 is provided, capable of being acted upon by the dynamic pressure measured in the static tubes by way of lines 102. (In FIG. 5, for the sake of simplicity, only one static tube is indicated at 47.) The arrangement is such that with drive motor 1 switched on, i.e. pump 2 running, the dynamic pressure measured at 47 will displace control piston 48 and hence control member 45 so that communication is set up between cylinder space 90 of releasing means 49 and point 92 under fluid pressure, by way of line 99; whereby, as previously described, action of pressure on piston 91 and hence release of locking means 50 takes place, so that the intended setting motion can be executed. On termination of the setting motion, i.e. stopping of drive motor 1 and pump 2, the dynamic pressure in the static tubes 47 disappears, whereupon control piston 48, movable for example against the action of a spring, displaces control member 45 so that the cylinder space 90 of releasing means 49 is connected to the tank 7 by way of line 100 and hence rendered pressureless, whereupon piston 91 causes the locking means 50 to engage under the action of spring 101.

Instead of static tubes, by way of further modification of the invention, an orifice installed in one of the two lines 5, 6 behind pump 2 (at point 47 in FIG. 5) may be provided. The cylinder of the control piston 48 may then be so connected to points just ahead of and behind the orifice that it may be acted upon by the difference of the pressures measured at both points. The arrangement is such that when such a pressure difference occurs, i.e. with pump 2 running, the control piston 48 is displaced, displacing the control member 45 actuated by it so that it connects the cylinder space 90 of releasing means 49 to point 92—under fluid pressure—of the hydraulic system, acting upon piston 91 of the releasing means and releasing the locking means 50 to execute a setting motion. With pump 2 inactive and no pressure difference across the orifice (at 47), the control piston 48 will displace control member 45 in a direction to establish the connection of cylinder space 90 of releasing means 49 with tank 7, rendering cylinder space 90 pressureless, so that the spring-loaded piston 91 engages the locking means.

By virtue of the structural and operational arrangements described above according to the invention, it is assured that after pump 2 switches off, and despite the contrary torque on the impeller of hydraulic servomotor 3 and the consequent nonpressureless condition of the line 5, 6, the locking means will function dependably. The excess pressure contact 21 of the adjustable check valve 15 should be adjusted for a lag in case of flow-guided control of pressurized fluid to the releasing means 49. For when pump 2 starts to deliver, fluid circulation will at first—since locking means 50 is still operative—take place by way of check valve 15, so that even though the hydraulic servomotor is still being retained at this instant, the pressure difference at the orifice, or the dynamic pressure at static tube 47, can actuate control piston 48 and release the locking means 50.

So that at need, for example in case of failure of power supply to the electric drive motor 1, a setting (restoring) motion can be executed, such as the closing of a flap actuated by the device according to the invention, whether by mass balance or under the action of a flow affecting such flap, the retaining or locking means must be brought into release position and the two oil chambers of the impeller of servomotor 3 put into communication with each other. The latter is very readily accomplished by providing the two check valves 10, 11 with mechanical means actuatable from outside the device, as in the form of a needle or pin serving to knock these valves open upon need. For one direction of setting, it suffices to knock one of these check valves open; owing to the pressure generated by an external torque by way of the impeller of the hydraulic servomotor 3, the other check valve will open automatically, establishing the connection. If the opening of the check valve as described has an adjustable limit of travel, the valve will open to only a limited extent, and in this version constitutes an adjustable throttling valve. In this way, the restoring motion can take place at adjustable speed.

Figure 6:
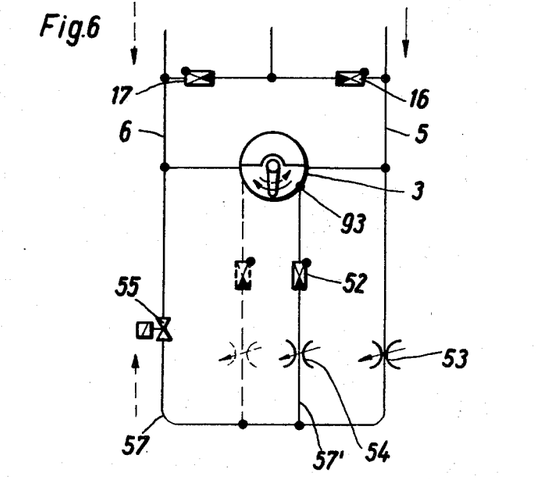
FIG. 6 shows the servo device with a restoring means.

Another feasible way of interconnecting the two oil chambers of the impeller of the hydraulic servomotor 3 is illustrated in FIG. 6. In this embodiment, there is provided a detour line 57 branching off from line 6 behind the hydraulic servomotor 3 and opening into line 5 ahead of the servomotor 3. In this detour line, as FIG. 6 shows, a magnetic valve 55 and an adjustable throttle 53 are arranged. So that the restoring travel can be traversed at variable speed, according to a further developmental form of the invention, a branch 57' is provided, parting from the detour line 57 between magnetic valve 55 and adjustable throttle 53, and connected to an exit port 93 of he hydraulic servomotor 3, which port is negotiated traversed by the impeller of motor 3 during its restoring stroke. In branch 57', an adjustable throttle 54 and a check valve 52, allowing flow towards the branching point of line 57' from line 57, is provided. The piston of the hydraulic servomotor 3 now automatically controls its speed during the restoring travel by traversing the exit port 93. The restoring then takes place initially at comparatively high and later, after traversing the first exit port, at substantially diminished setting speed.

If necessary, a plurality of branches departing from detour line 57, each with an adjustable throttle and a check valve, may be provided, connected to different exit ports of the hydraulic servomotor 3, to be traversed successively by the impeller of the motor during its restoring travel. In this way, the restoring travel can be traversed with unlike or predeterminately varied speeds maintained over a plurality of segments.

The arrangement may be such that the magnetic valve 55 will automatically allow flow through line 57 in case of power failure. Instead of the magnetic valve 55, however, a valve for manual operation may be provided.

Figure 7:
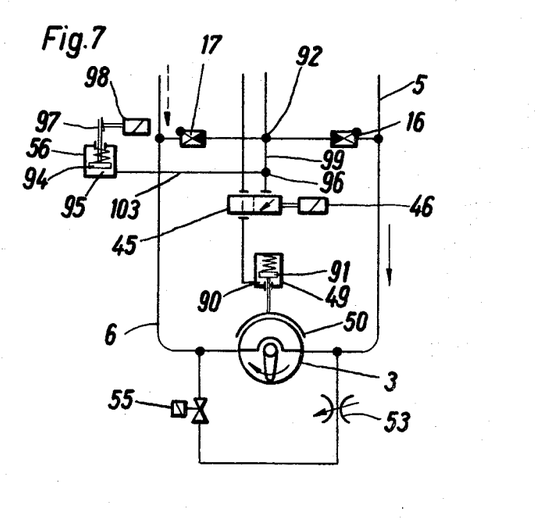
FIG. 7 shows a further elaboration of the servo device of the invention.

So that the retaining or locking means 50 can be released even with pump 2 inactive, it is necessary, besides actuating the control member 45, as may be done by means of electromagnet 46, to generate a pressure surge to actuate the release means 49. An arrangement provided for this purpose is illustrated in FIG. 7. It consists of a spring- or mass-loaded piston 94 contained in a pressure medium reservoir 56 whose cylinder space 95 is connected by a line 103 to a point 96 of the hydraulic system that is under fluid pressure when pump 2 is operating, so that the reservoir 56 will be filled by way of line 103 the first time the servo device is operated. When piston 94 has reached its extreme position as the reservoir is filled, it is latched in that position, namely by means of the latching device indicated at 97. Thus the reservoir may stand in that position for any length of time without losing its capacity to store pressure.

The point of connection 96 of the line 103 leading to the reservoir 56 is located, as FIG. 7 shows, in the line 99 leading to control member 45, and in fact the arrangement is such that the control member 45, capable of being set by means of electromagnet 46, connects line 99 to the cylinder space 90 of releasing means 49 when the electromagnet is actuated. Further, a releasing means 98 for the latch of reservoir 56 is provided.

The arrangement just described operates as follows: When an order is given to release the restoring means, then, on the make-or-break principle, control member 45 is so actuated by magnet 46 that connection is established between cylinder space 95 of reservoir 56 and cylinder space 90 of the releasing means by way of line 103, 99; also, the releasing means 98 of latch 97, setting the reservoir piston 94 free, is rendered operative. Reservoir 56 now delivers a pressure surge to open the retaining or locking means 50. The continued open condition of the retaining means is then maintained by the pressure generated by the restoring force of the hydraulic servomotor 3 through its impeller, which is transmitted by way of line 5, check valve 16, point 92, line 99 and control member 45 to beneath piston 91 of the releasing means 49. The circuit may be so arranged that for the restoring motion in event of failure of power for the drive motor 1, the actuation of electromagnet 46, releasing means 98 and magnetic valve 55 takes place either automatically or at will.

It is of course conceivable also that the arrangement shown in FIG. 6, with detour line 57 permitting regulated connection of the two oil chambers of the impeller of the hydraulic servomotor 3, could be used even if the provision of a retaining means 50 and/or brake 68 is dispensed with.

In one version of the servo device—in which it may preferably be employed without the retaining means originally described, but with a detour line 57 (open service position) capable of being opened and closed by means of a magnetic valve 55—there is an apparatus freely movable by external torques, and capable of being used for example in combination with a check flap actuated by a flow. When so ordered, in such an arrangement the detour line 57 can be closed and the driven device (flap) moved to a desired setting or closed at will by actuating the servo device. In combination with a setting lock arranged externally, such a drive may be used for a throttle shutoff check flap.

Figure 8:
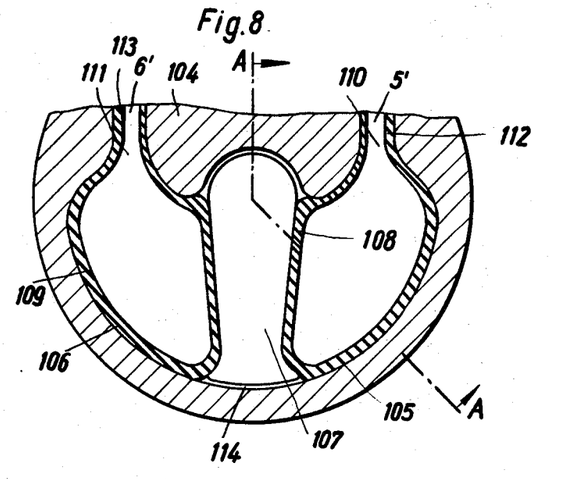
FIGS. 8 and 9 are fragmentary sectional views of the hydraulic servomotor, FIG. 9 being taken on line A-A of FIG. 8.
Figure 9:
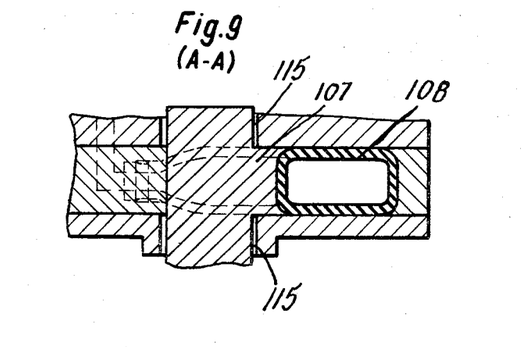

FIGS. 8 and 9 show an especially advantageous embodiment of a hydraulic servomotor for the devices in question. Numeral 104 designates the motor housing in which the impeller 107 is mounted. Numerals 105 and 106 designate the two pressure chambers, and 5' and 6' are the points of connection of the hydraulic medium incoming and outgoing lines 5, 6. As FIG. 8 shows, one of the bladders 108, 109 of highly elastic material is arranged in such pressure chamber 105, 106. Each of these bladders has an aperture 110, 111. At these apertures, the bladders connect tightly at 112, 113 to the pressure medium incoming and outgoing lines 5', 6' in the motor housing.

If for example bladder 108 is acted upon by hydraulic medium by way of an incoming line 5, 5', it expands and transmits the pressure to impeller 107, setting it in clockwise rotation, while the other bladder 109, communicating with the outgoing line 6', 6, is elastically compressed by the impeller, discharging its fluid contents into the outgoing line 6. The design of the pressure chamber walls and impeller, as the drawing shows, is such that the bladders are everywhere in snug contact with the chamber walls and impeller, the bladders themselves being largely relieved by this support while transmitting the operating pressure. By the arrangement of bladders 108, 109 according to the invention, the special seals otherwise required between impeller 107 and motor housing 104 at point 114 and where the motor shaft passes through the housing at 115 are eliminated. This type of hydraulic servomotor according to he invention is not limited to the embodiment represented. With suitable modifications, it is readily applicable to double-vane impeller systems as well.

If, in electrohydraulic servo devices, the servomotors are equipped with bladders 108, 109 as provided according to the invention, then, in especially advantageous manner, self-arrest of the device can be achieved by installing a tightly closing shut-off member in one or both of the incoming and outgoing lines 5, 6, ahead of and/or behind the hydraulic servomotor 3. This shutoff means may for example be actuated by a magnetic valve by way of a relay so as to leave the fluid circuit clear as long as the electric drive motor 1 is switched on, and close the fluid circuit if the drive motor 1 is switched off or the setting motion of the device has been completed. The result is an especially advantageous, dependable, and yet economical form of retaining means for the servo device, rendering the arrangement of a special locking or braking means superfluous.

What we claim is:

1. An electrohydraulic servo device comprising an electric drive motor, a fluid medium pump connected thereto and driven thereby, a fluid-containing tank, a hydraulic servomotor communicating with and acted upon by the pump medium, means for reversing or operating in either of opposite directions of rotation the electric drive motor, the pump and the servomotor, said pump being connected to the servomotor by incoming and outgoing pressure medium lines forming a closed circuit, each of the said incoming and outgoing lines communicating with the fluid-containing tank and having a check valve therein open for the direction of medium flow from tank to pump, and further comprising a retaining means acting upon the hydraulic servomotor when the drive motor is switched off, the retaining means being in the form of a locking means consisting of two radially grooved flat plates, one attached to the impeller of the hydraulic servomotor and the other mounted in the motor housing, secured against rotation but axially displaceable.

2. An electrohydraulic servo device comprising an electric drive motor, a fluid medium pump connected thereto and driven thereby, a fluid-containing tank, a hydraulic servomotor communicating with and acted upon by the pump medium, means for reversing or operating in either of opposite directions of rotation the electric drive motor, the pump and the servomotor, said pump being connected to the servomotor by incoming and outgoing pressure medium lines forming a closed circuit, each of the said incoming and outgoing lines communicating with the fluid-containing tank and having a check valve therein open for the direction of medium flow from tank to pump, and further comprising a retaining means in the form of a multiple-disc brake acting upon the hydraulic servomotor when the drive motor is switched off, the locking means being held in braking or locking position when the pump is stationary by a force acting upon it, and a hydraulic releasing means being provided for the brake or locking means, which is actuated by fluid pressure generated by the pump when running, and wherein (a) the brake releasing means consists of a piston displaceable in a hydraulic cylinder and mechanically connected to the brake, (b) each of the incoming and outgoing lines connecting the pump to the servomotor communicates by way of a check valve with the brake release cylinder, which check valve opens for the direction of flow to the brake release cylinder, while the line leading from the check valves to the brake release cylinder is so connected to the latter that fluid pressure arising in the line tends to displace the piston of the brake release means in the direction of releasing the brake and (c) the brake release cylinder is provided with a pressure control valve whose control piston is acted upon by the fluid pressure in the incoming and outgoing lines by a line branching off from a connecting line between the two check valves in such a way that in the presence of such fluid pressure the said control piston will close a line connecting the brake release cylinder to the fluid tank, the absence of fluid pressure in the incoming and outgoing lines opening said line.

3. A servo device according to claim 2, wherein the incoming and outgoing lines have one additional check valve each, opening in the direction of flow to the servomotor, and a control pressure valve for each whose control piston opens or closes a detour line connected to the incoming and outgoing lines before and after the additional check valves and the control piston of each of the control pressure valves being acted upon by the fluid pressure in the lines by a control line piston of the control pressure valve located ahead of the servomotor with the fluid pressure in the outgoing line, and the control piston of the control pressure valve being located behind the servomotor with the pressure existing in the incoming line.

4. A servo device according to claim 3, wherein there is an additional connecting line short circuiting the hydraulic servomotor between the incoming and outgoing lines in which lines is disposed a magnetic valve opening the connecting line in case of electric power failure.

5. A servo device according to claim 4, wherein the magnetic valve is replaced by a manually actuatable valve.

6. A servo device according to claim 4, further comprising a hydraulic oil reservoir provided with an air cushion and connected by a line containing a shutoff valve to the brake release cylinder in such manner that fluid pressure arising in the line tends to displace the piston of the brake releasing means in the direction of releasing the brake.

7. A servo device according to claim 6, wherein there is an additional connecting line between the hydraulic oil reservoir and that point of the hydraulic oil system that is under fluid pressure when the pump is operating, a check valve being arranged in said line opening in the direction of flow to the hydraulic oil reservoir.

8. A servo device according to claim 7, wherein the valve in arranged in is a magnetic valve opening upon failure of electric power.

9. A servo device according to claim 7, wherein the shutoff valve arranged in the line is a manually actuatable valve.

10. An electrohydraulic servo device comprising an electric drive motor, a fluid medium pump connected thereto and driven thereby, a fluid containing tank, a hydraulic servomotor communicating with and acted upon by the pump medium, means for reversing or operating in either of opposite directions of rotation the electric drive motor, the pump and the servomotor, said pump being connected to the servomotor t8e fluid-containing incoming and outgoing pressure medium lines forming a closed circuit, each of the said incoming and outgoing lines communicating with the fluid-containing tank and having a check valve therein open for the direction of medium flow from tank to pump, and further comprising a retaining means in the form of a multiple-disc brake acting upon the hydraulic servomotor when the drive motor is switched off, the locking means being held in braking or locking position when the pump is stationary by a force acting upon it, and a hydraulic releasing means being provided for the brake or locking means, which is actuated by fluid pressure generated by the pump when running, and further comprising a control member which in one position connects the cylinder space ahead of the piston of the releasing means for the locking means to a point of the fluid circuit that is under pressure when the pump is operating, and in its other position establishing communication between the cylinder space and the fluid tank, an electromagnet to actuate the control member according to the switch condition of the drive motor in the sense that when the drive motor is switched on the control member establishes connection between the cylinder space of the releasing means and a point of the hydraulic system under fluid pressure, the drive motor when switched off establishing connection of the cylinder space with the fluid tank.

11. A servo device according to claim 10, wherein the control member is actuable responsive to the flow condition in the incoming and outgoing lines, having an orifice in one of the two lines beyond the pump and a control piston capable of being acted upon by the pressure differential in front of and behind said orifice to actuate the control member, the control member being so constructed and arranged that when a pressure difference occurs the control member actuated by the control piston establishes connection between the cylinder space of the releasing means and a point of the hydraulic system under fluid pressure, and when the fluid pressure before and after the orifice is the same, the control member establishes connection of the cylinder space with the fluid tank.

12. An electrohydraulic servo device comprising an electric drive motor, a fluid medium pump connected thereto and driven thereby, a fluid-containing tank, a hydraulic servomotor communicating with and acted upon by the pump medium, means for reversing ro operating in either of opposite directions of rotation the electric drive motor, the pump and the servomotor, said pump being connected to the servomotor by incoming and outgoing pressure medium lines forming a closed circuit, each of the said incoming and outgoing lines communicating with the fluid-containing tank and having a check valve therein open for the direction of medium flow from tank to pump, and further comprising a retaining means in the form of a multiple-disc brake acting upon the hydraulic servomotor when the drive motor is switched off, the locking means being held in braking or locking position when the pump is stationary by a force acting upon it, and a hydraulic releasing means being provided for the brake or locking means, which is actuated by fluid pressure generated by the pump when running, and further comprising a control member which in one position connects the cylinder space ahead of the piston of the releasing means for the locking means to a point of the fluid circuit that is under pressure when the pump is operating, and in its other position establishing communication between the cylinder space and the fluid tank, and wherein static tubes are installed in the incoming and outgoing lines behind the pump and a control piston capable of being acted upon by the dynamic pressure in the static tubes to actuate the control member in such manner that in the presence of dynamic pressure, the control piston shifts the control member to establish connection between the cylinder space of the releasing means and a point of the hydraulic system under fluid pressure, in the absence of dynamic pressure, the control member being so shifted by the control piston as to establish connection of the cylinder space with the fluid tank, and having an adjustable check valve in which the excess pressure contact of the adjustable check valve can be set for a lag.

13. A servo device according to claim 12, having a detour line branching off from the line following the hydraulic servomotor and provided with a magnetic valve there in, and an adjustable throttle opening into the incoming line ahead of the servomotor.

14. A servo device according to claim 13, wherein there is a branch departing from the detour line between the magnetic valve and adjustable throttle and connected to an exit port of the hydraulic servomotor negotiated by the impeller of the motor during its restoring travel, and by an adjustable throttle and check valve in the branch.

15. A servo device according to claim 14, having a plurality of branches departing from the detour line each provided with an adjustable throttle and check valve both connected to different exit ports of the hydraulic servomotor, which exit ports are negotiated successively by the impeller of the motor during its restoring travel.

16. A servo device according to claim 15, having a pressure medium reservoir containing a spring- or mass-loaded piston whose cylinder space is connected both to a point of the hydraulic circuit under fluid pressure when the pump is operated and to the control member in such manner that the control member in "on" position connects the medium reservoir to the cylinder space of the releasing means.

17. A servo device according to claim 16, wherein latching means is provided for the piston of the medium reservoir whereby this piston is kept in extreme position once the reservoir has been filled, and a releasing means for the latch.